US009804749B2

United States Patent
Shankar et al.

(10) Patent No.: US 9,804,749 B2
(45) Date of Patent: Oct. 31, 2017

(54) CONTEXT AWARE COMMANDS

(71) Applicant: Microsoft Technology Licensing, LLC, Redmond, WA (US)

(72) Inventors: Anusha Shankar, Woodinville, WA (US); Bharath Swaminathan, Renton, WA (US); Ramanathan Pallassana, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 326 days.

(21) Appl. No.: 14/303,082

(22) Filed: Jun. 12, 2014

(65) Prior Publication Data
US 2015/0248201 A1  Sep. 3, 2015

Related U.S. Application Data

(60) Provisional application No. 61/947,186, filed on Mar. 3, 2014.

(51) Int. Cl.
*G06F 3/048*  (2013.01)
*G06F 3/0484*  (2013.01)
*H04L 29/08*  (2006.01)
*H04L 29/06*  (2006.01)
*G06F 3/0481*  (2013.01)

(52) U.S. Cl.
CPC .......... *G06F 3/0484* (2013.01); *G06F 3/0481* (2013.01); *H04L 67/10* (2013.01); *H04L 67/42* (2013.01); *H04L 69/329* (2013.01)

(58) Field of Classification Search
CPC ................................ G06Q 50/01; G06Q 50/12
See application file for complete search history.

(56) References Cited

U.S. PATENT DOCUMENTS

| 6,307,544 | B1 | 10/2001 | Harding |
| 7,512,899 | B1 * | 3/2009 | Hoiem ................. G06F 9/4443 715/762 |
| 7,600,197 | B2 | 10/2009 | Gourdol et al. |
| 8,079,511 | B2 | 12/2011 | Silverbrook et al. |
| 8,243,017 | B2 | 8/2012 | Brodersen et al. |

(Continued)

FOREIGN PATENT DOCUMENTS

| EP | 2 381 353 A1 | 10/2011 |
| WO | WO 2013/010155 A2 | 1/2013 |

OTHER PUBLICATIONS

"User-defined Commands", Retrieved on: Feb. 24, 2014, Available at: https://www.gpsoft.com.au/help/opus10/index.html#!Documents/User_commands.htm.

(Continued)

*Primary Examiner* — Claudia Dragoescu
(74) *Attorney, Agent, or Firm* — Christopher R. Christenson; Kelly, Holt & Christenson PLLC

(57) ABSTRACT

A client device identifies a current context of an application and sends that context to a command component on a server. The client device receives a set of commands that are valid for that context and displays the commands on the client device. When a user input is received changing the context, a new command set can be locally computed based on the set of commands received from the server, or the new context can be sent to the server to receive the new command set.

8 Claims, 15 Drawing Sheets

(56) References Cited

U.S. PATENT DOCUMENTS

| | | | |
|---|---|---|---|
| 2005/0057436 A1* | 3/2005 | Alden | G06F 19/327 |
| | | | 345/2.1 |
| 2006/0036946 A1 | 2/2006 | Radtke et al. | |
| 2007/0136683 A1* | 6/2007 | Heidari | G06F 9/4443 |
| | | | 715/792 |
| 2011/0016425 A1 | 1/2011 | Homburg et al. | |
| 2011/0302487 A1* | 12/2011 | McCormack | G06F 9/4443 |
| | | | 715/239 |
| 2013/0019173 A1 | 1/2013 | Kotler et al. | |
| 2013/0019175 A1 | 1/2013 | Kotler et al. | |
| 2013/0046963 A1 | 2/2013 | Kienzle | |
| 2013/0132899 A1 | 5/2013 | Scott | |
| 2013/0138424 A1 | 5/2013 | Koenig et al. | |
| 2013/0246913 A1* | 9/2013 | McCormack | G06F 3/017 |
| | | | 715/255 |

OTHER PUBLICATIONS

"Microsoft Dynamics CRM 2013", Published on: Jul. 31, 2013, Available at: http://e3consulting.files.wordpress.com/2013/10/41053_crm2013_m01_app.pdf.

"Second Written Opinion Issued in PCT Application No. PCT/US2015/017880", Mailed Date: Feb. 11, 2016, 6 Pages.

International Search Report and Written Opinion for International Application No. PCT/US2015/017880, date of mailing: May 11, 2015, date of filing: Feb. 27, 2015, 8 pages.

"International Preliminary Report on Patentability Issued in PCT Application No. PCT/US2015/017880", Mailed Date: May 17, 2016, 7 pages.

* cited by examiner

FIG. 2B (Rotated figure showing a dashboard UI)

ACME  WORKSPACE  DASHBOARD                                    Create (+)    John Doe  (?)

☐ Save  ☐ New  ☐ Delete  ☐ Qualify  ☐ Disqualify ∨         — 190, 182, 192

Lead ∨                                                Rating | Status | Owner*
(Sample Maps)                                          Warm  | New    | J. Doe ① Qualify (Active)          🔒 Develop      — 196   🔒 Propose      🔒 Close    ▲ Next Stage
Existing Contact?  click to enter    Estimate Budget  click to enter   click to enter        — 194
Existing Account?  click to enter    Purchase Process  click to enter
Purchase Timeframe click to enter    Identify Decision Mak click to enter Summary                              POSTS  ACTIVITIES  NOTES          Stakeholders
Contact                                                                Name                    Role   +
Topic*      treat                    Enter post here         Post      No stakeholders found.
Name*       (Sample Maps)
Job Title   Purchasing Manger        Both  Auto posts  User posts
Business Phone  555-1111
Mobile Phone    --                   ☐  Sample Maps                    Competitors
Email           --                      J. Doe created by Sample Maps  Name                    Role   +
Company                                 One J. Doe's wall              No competitors found.
Company*    ABC Co.                     4/23/2013 10:31 PM                                     — 198
Website     --
Address     123 Street
            Anywhere, USA 5600 Characters Gone
Name
Name 1                Image of map

FIG. 2C

ACME  WORKSPACE  DASHBOARD                                    Create (+)─182  John Doe  ?

☐ New  ☐ Edit  ☐ Activate  ☐ Deactivate  ☐ Delete ∨  ⋯
                                              └─234

📌 Inactive Accounts ∨

| Account Name ▲ | Primary Contact | Main Phone Number | Location |
|---|---|---|---|
| a | | | |
| A. ABC Corporation (sample) | R. Lyon (sample) | 555-1234 | Phoenix |
| Adventure Co. (sample) | J. Doe | 555-3210 | Phoenix─232 |
| Winery (sample) | | 555-1098 | Phoenix |

CONTEXT AWARE COMMANDS

CROSS-REFERENCE TO RELATED APPLICATION

The present application is based on and claims the benefit of U.S. provisional patent application Ser. No. 61/947,186, filed Mar. 3, 3014, the content of which is hereby incorporated by reference in its entirety.

BACKGROUND

Computer systems are currently in wide use. Many computer systems are quite large, and have a large number of pages, forms, or other display surfaces.

For instance, some such computer systems include business systems. Business systems can include, for example, enterprise resource planning (ERP) systems, customer relations management (CRM) systems, line-of-business (LOB) systems, among others. These types of systems can have thousands of different forms, each of which have many different controls. The controls can have commands (or command input mechanisms) that can be actuated by a user to perform operations.

In fact, almost every user interface surface in a business system has a variety of different types of commands. The commands change based upon the context of the business system. For instance, if the user is viewing an opportunity form, the form may display commands that allow the user to edit or delete the opportunity record. If the user selects a given line item in a list or grid within the opportunity record, the user may be presented with additional commands that allow the user to perform other actions with respect to that list item. The additional commands are provided because the context of the underlying application changed. The user was not simply reviewing the opportunity record anymore, but the user had now selected a list or grid item.

Currently, all commands are hard coded on the various pages on which they are generated. Therefore, there is virtually no mechanism by which the commands on a given page can be extended or otherwise customized, without a great deal of coding The discussion above is merely provided for general background information and is not intended to be used as an aid in determining the scope of the claimed subject matter.

SUMMARY

A client device identifies a current context of an application and sends that context to a command component on a server. The client device receives a set of commands that are valid for that context and displays the commands on the client device. When a user input is received changing the context, a new command set can be locally computed based on the set of commands received from the server, or the new context can be sent to the server to receive the new command set.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIGS. 2A-2D are exemplary user interface displays illustrating how commands change with context.

DETAILED DESCRIPTION

Figure 1A:
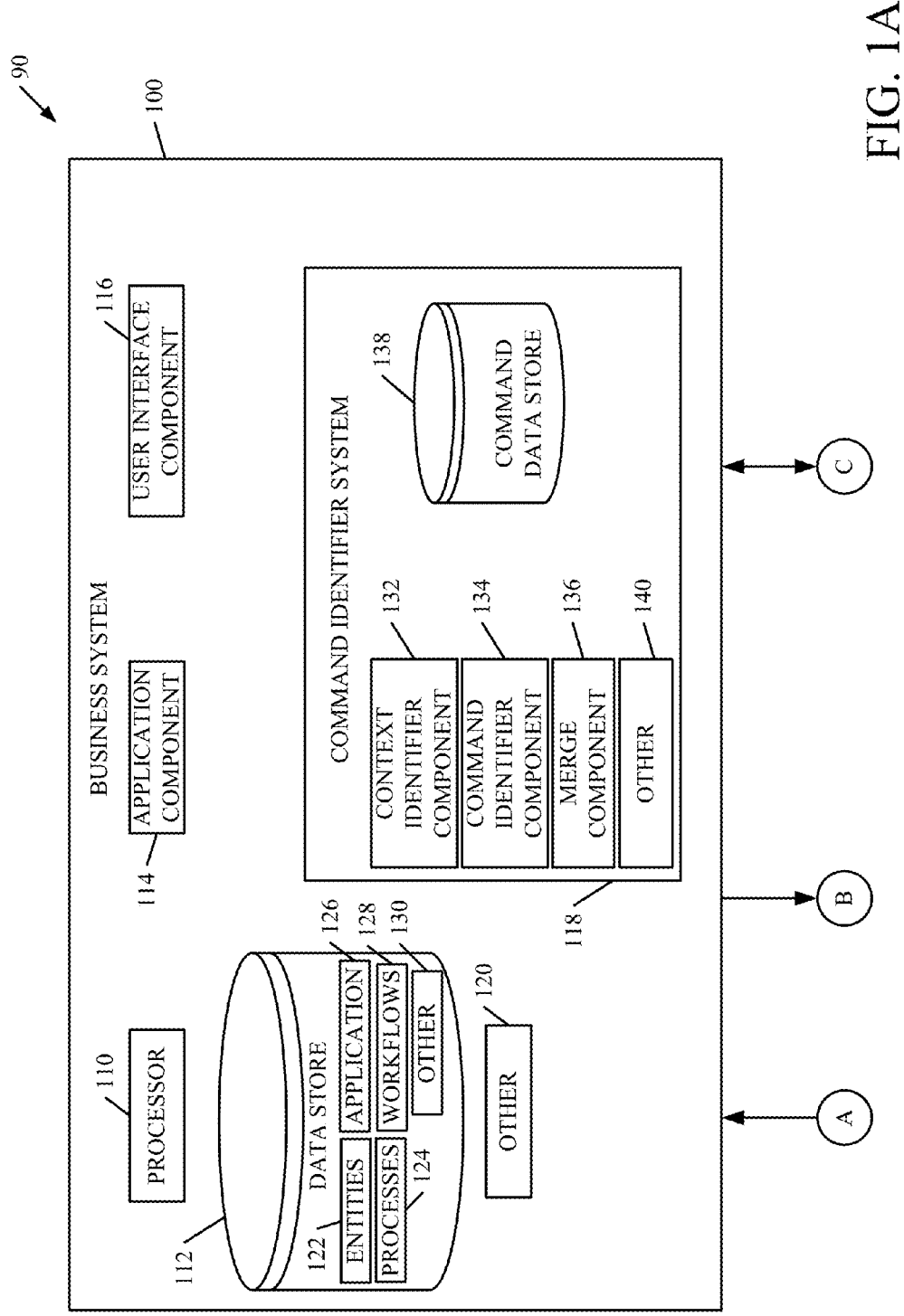
FIGS. 1A and 1B (collectively FIG. 1) show a block diagram of one illustrative business system architecture.
Figure 1B:
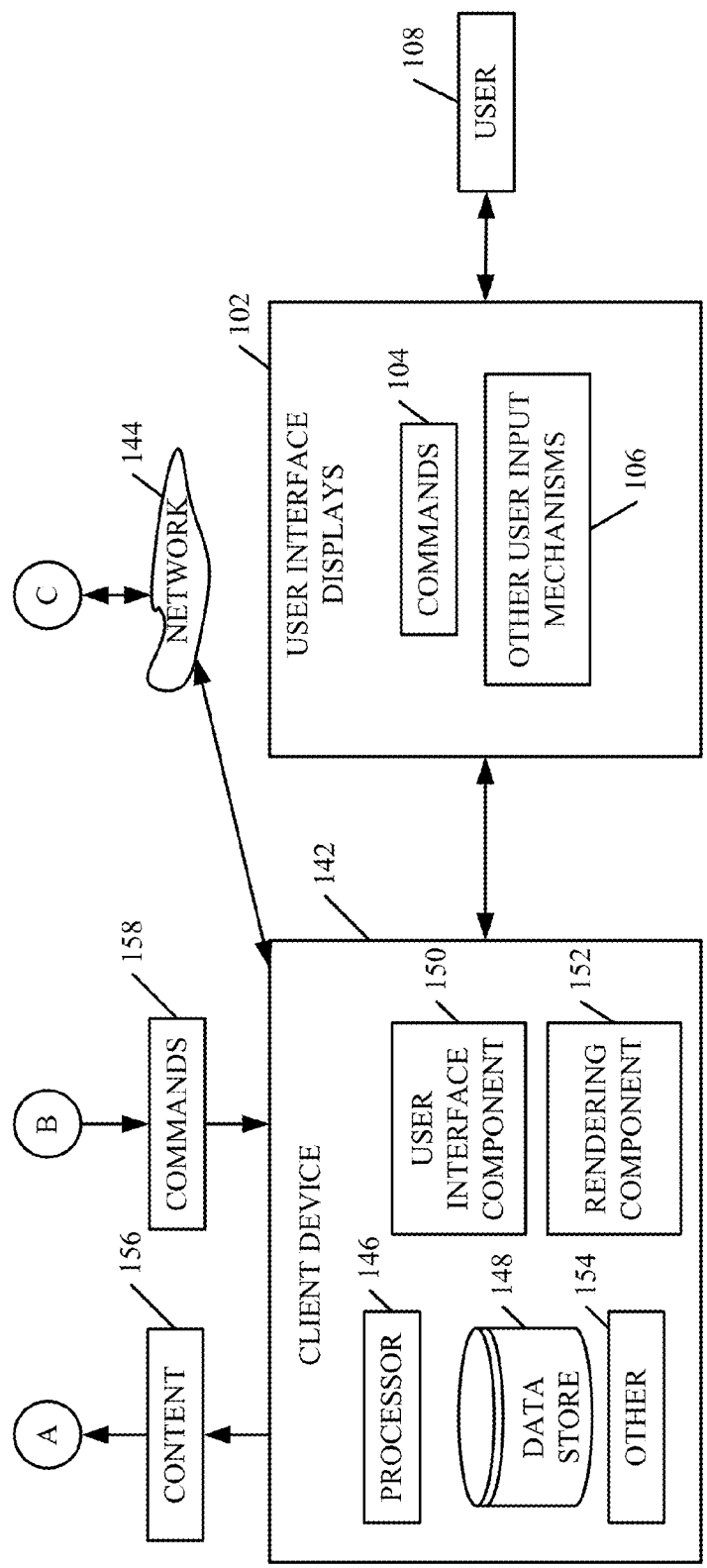

FIGS. 1A and 1B (collectively FIG. 1) show a block diagram of a business system architecture 90 that includes one illustrative business system 100. Business system 100 is shown generating user interface displays 102 that can include commands 104, as well as other user input mechanisms 106. User 108 interacts with the user interface displays 102 (such as with the commands and other user input mechanisms) in order to interact with, and manipulate, business system 100.

Business system 100 illustratively includes processor 110, data store 112, application component 114, user interface component 116 and command identifier system 118. It can also include other components 120 as well.

Data store 112, itself, illustratively includes entities 122, processes 124, applications 126, workflows 128 and other data records 130. Entities 122 illustratively describe and define entities within business system 100. For instance, a customer entity describes and defines a customer. A vendor entity describes and defines a vendor. An inventory item entity describes and defines an item of inventory. A purchase order entity describes and defines a purchase order. This list is but a small example of the various different types of entities that can be defined within business system 100.

Applications 126 are illustratively business applications, such as general ledger applications, other accounting applications, inventory tracking applications, applications that track opportunities, as well as a host of other business applications. Application component 114 illustratively runs applications 126, which can include business processes 124 and workflows 128. Processes 124 and workflows 128 illustratively operate on business data entities 122 and other business records 130 to enable user 108 to perform his or her tasks within business system 100. The processes and workflows can be automated, semi-automated, or manual.

User interface component 116, either by itself, or under the control of other items in business system 100, illustratively generates user interface displays 102.

Command identifier system 118 illustratively includes context identifier component 132, command identifier component 134, merge component 136, command data store 138, and it can include other items 140 as well. FIG. 1 shows that user 108 can interact with business system 100 using client device 142. This interaction can take place either over network 144 or directly.

In the embodiment shown in FIG. 1, client device 142 illustratively includes processor 146, data store 148, user interface component 150 and rendering component 152. It can also include other items 154 as well.

Before describing the operation of client identifier system 118 and client device 142 in more detail, a brief overview will be provided. User 108 is illustratively a user that accesses one or more of the business applications 126 in business system 100. The business applications illustratively provide information that is rendered by rendering component 152 as user interface displays 102, including commands 104 and other user input mechanisms 106. In order to render the commands 104 in an extensible way, rendering component 152 identifies a context of the particular application being used by user 108 and sends the context information 156 to command identifier system 118. Context identifier component 132 identifies the particular context of the application and provides it to command identifier component 134. Command identifier component 134 identifies the set of valid commands, given the particular context, and provides commands 158 back to rendering component 152 where they are rendered as commands 104 on user interface displays 102. Thus, the valid set of commands can easily be extended or customized by modifying command store 128.

Figure 2:
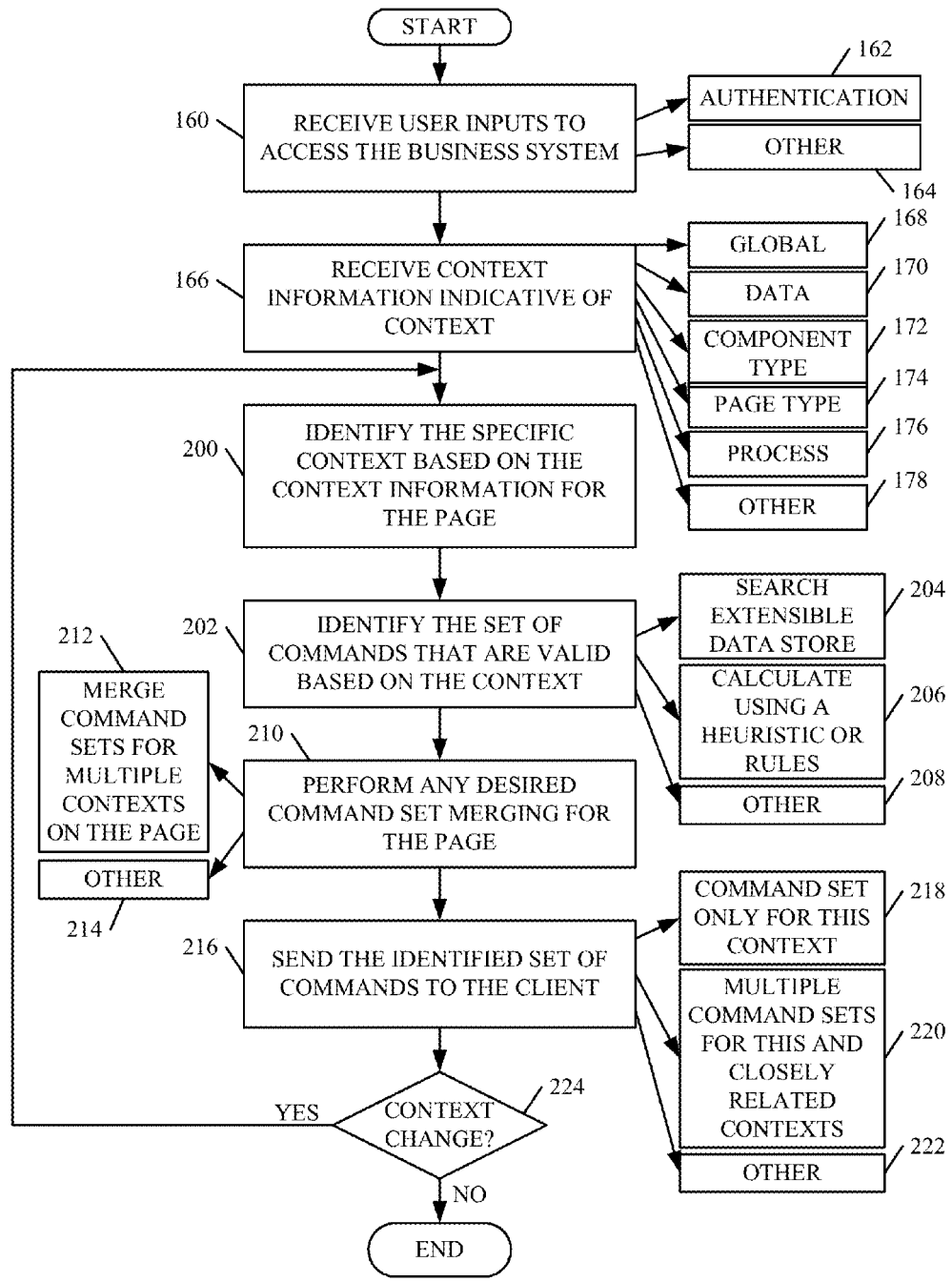
FIG. 2 is a flow diagram illustrating one embodiment of the operation of the command identifier system shown in FIG. 1.

FIG. 2 is a flow diagram illustrating one embodiment of the operation of system 118, in more detail. System 118 first receives user inputs indicating that the user is accessing the business system 100. This is indicated by block 160 in FIG. 2. This can be done by providing authentication information (such as a username and password) 162, or by providing other information 164.

When rendering component 152 is about to render a page for one of the business applications being accessed by user 102, it sends the context information 156 to context identifier component 132 in system 118. Receiving the context information indicative of the context is indicated by block 166 in FIG. 2. The context information can indicate a wide variety of different contexts. For instance, a given page may have a global context 168 that provides certain commands. It may have data display elements 170 that provide other commands. It may have component type display elements 172 or page type elements 174 that provide still other commands and process elements 176 that, themselves, include other commands. It can include other display elements 178 that include other commands as well.

Figure 2A:
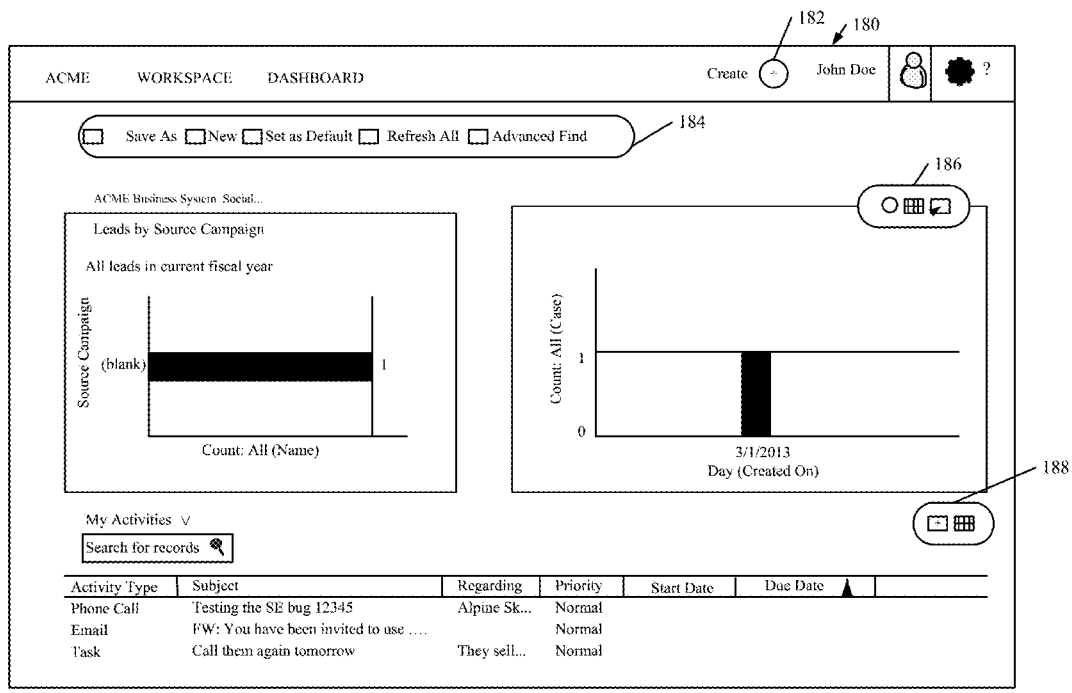

FIG. 2A shows one exemplary user interface display 180 that indicates this. It can be seen that user interface display 180 is illustratively a dashboard display. It includes a set of global commands generally indicated at 182. The global commands apply to the entire user interface display 180. It also includes a more specific set of commands 184, that are specific to the particular display type (the dashboard display type) of user interface display 180. Display 180 also includes a number of different component types. For instance, it includes a chart display component that includes chart-specific commands 186. It also includes a grid display component that includes grid-specific commands 188. Of course, these are examples only.

FIG. 2B shows another exemplary user interface display 190. Display 190 is a display of a form. Therefore, it includes global commands 182 that are the same as those shown in FIG. 2A. However, because it is a display of a form, it also includes form-specific commands 192. The form includes the display of a process and thus includes a set of process-specific commands 194. Within the process are a set of stages. Therefore, the display also includes a set of stage-specific commands 196. It can also be seen that display 190 includes a grid and thus includes grid-specific commands 198 as well.

It will be noted that FIGS. 2A and 2B are only two examples of user interface displays that each include a plurality of different sets of valid commands, based upon the context of the display. Therefore, if the user switches from the display shown in FIG. 2A to that shown in FIG. 2B, then the context changes and thus the different sets of valid commands change as well.

Referring again to the flow diagram of FIG. 2, context identifier component 132 identifies the particular context based upon the context information 156 received from rendering component 152 on the client device. Identifying the specific context is indicated by block 200 in FIG. 2.

Once the context is identified, command identifier component 134 uses that context to identify one or more sets of commands that are valid based upon the context. This is indicated by block 202. Component 134 can do this in a wide variety of different ways. For instance, it can search for commands in command data store 138, based upon the context. This is indicated by block 204. It can also calculate the set of commands using a heuristic, or a set of rules, or otherwise. This is indicated by block 206. It can identify the sets of valid commands, based on the context, in other ways as well, and this is indicated by block 208.

Merge component 136 then performs any desired command set merging for the given page. This is indicated by block 210. By way of example, the user interface displays shown in FIGS. 2A and 2B include a wide variety of different contexts, each with associated valid commands. Those contexts include the global context, a form or dashboard-specific context, chart and grid-specific contexts, a process-specific context and even a stage-specific context. Each of those contexts has an associated valid set of commands, and they can be merged into one set of commands for transmission to rendering component 152 on client device 142. Merging the command sets for multiple contexts on the same page is indicated by block 212. Merging in other ways is indicated by block 214.

Once the sets of valid commands are identified and merged (if desired) they are sent to the client device 142. This is indicated by block 216 in FIG. 2. This can also be done in a number of different ways.

For instance, in one embodiment, system 118 simply sends the sets of valid commands that are valid for the different contexts that are present on the display screen being rendered. Therefore, with each change in context, a round trip is made back to system 118 from client device 142 for a new valid set of commands based upon the new context. However, in another embodiment, once a context is received by system 118, it sends the valid sets of commands for not only that specific set of contexts, but for other closely related contexts. For instance, it may be that when the user displays a page that has a plurality of grid elements (e.g., lists), the user normally then selects one or more of the items in a given grid. That being the case, the context will change and so may the set of valid commands. However, because system 118 knows that the current context is for a plurality of grid displays, it may send the valid commands for the present set of contexts, along with the valid commands for a context in which the user selects one of the grid items. In that case, when the context is changed in that way, the client device 142 can process the change in context to identify the new sets of valid commands, without making a round trip back to system 118. All of these configurations are contemplated herein. Sending the command set only for the present context on the displayed page is indicated by block 218 in FIG. 2 and sending multiple command sets for this and closely related contexts is indicated by block 220. The command sets can be sent in other ways as well, and this is indicated by block 222.

The user may then change the context, as indicated by block 224. If so, then processing reverts back to block 200 where the new context is identified and the new set of commands are identified. It will be noted that, where the context is processed locally, the process steps are performed on device 142. However, where a round trip to system 118 is used, then they are performed at system 118.

Figure 2C:
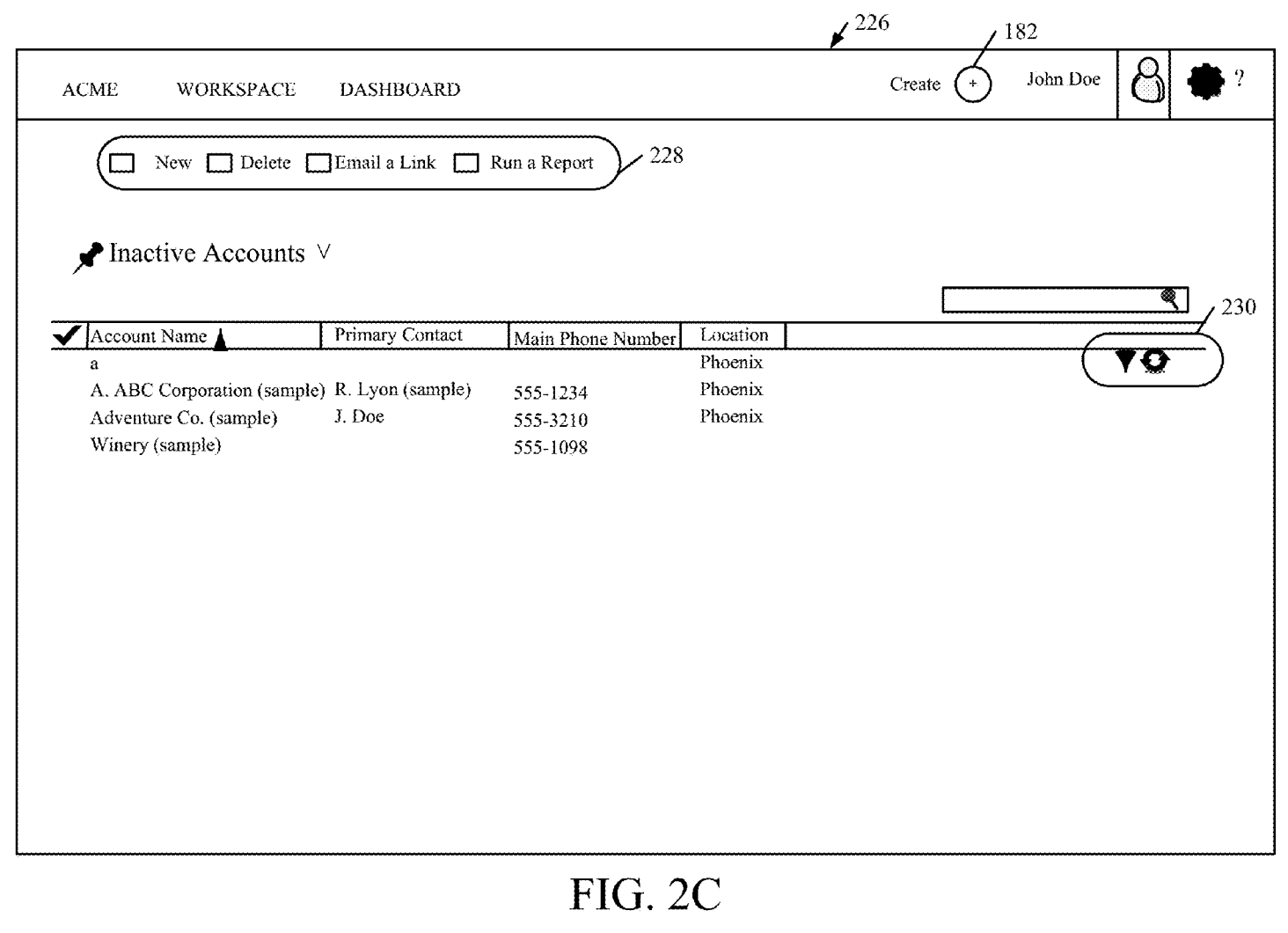

FIGS. 2C and 2D show one example of how a context (and resultant valid command set) may change based on a user input. In the embodiment shown in FIG. 2C, user interface display 226 displays a grid element. Therefore, the valid commands are global commands 182 and grid-specific commands 228 and 230. FIG. 2C shows that a user has changed the context by selecting a list item (or grid item) 232 within the grid element. In that case, the global commands 182 and one set of grid commands 230 remain unchanged. However, the grid-specific commands 228 that are offered to the user have now been changed to those shown generally at 234. That is, because the user has selected list item 232, the user is now offered a command set by which the user can edit, activate or deactivate the selected list item 232.

Figure 3:
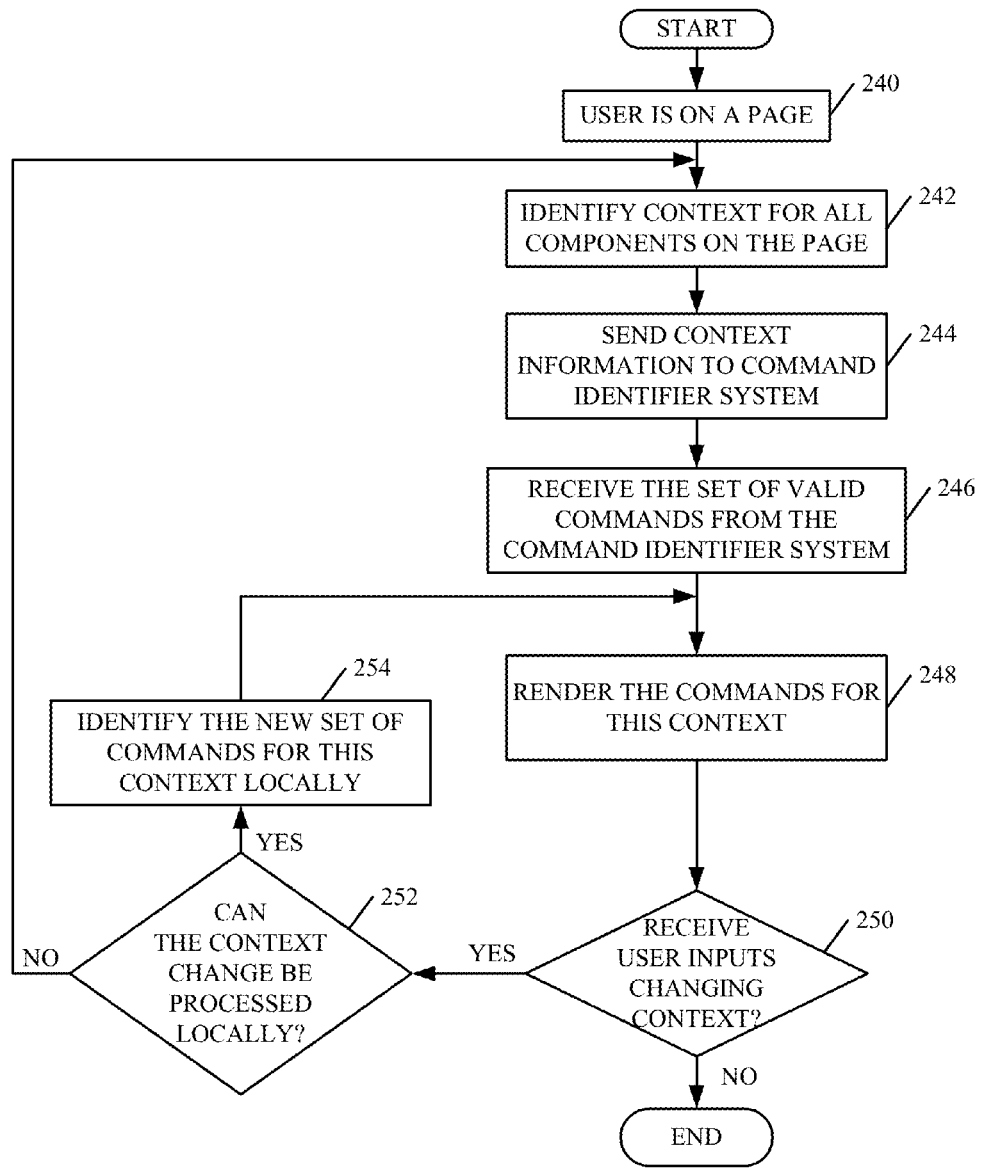
FIG. 3 is a flow diagram illustrating one embodiment of a rendering component of a client device in rendering commands for a given context.

FIG. 3 is a flow diagram illustrating one embodiment of the operation of client device 142 in rendering commands. It is first assumed that user 108 is viewing a page generated by one of the applications 126 in business system 100. This is indicated by block 240 in FIG. 3. Rendering component 152 identifies the context for all components on the page. This is indicated by block 242. Client device 142 then sends the context information to the command identifier system 118. This is indicated by block 244. Command identifier component 118 then calculates the set of commands and sends it back to client device 142. Receiving the set of valid commands from the command identifier system is indicated by block 246. Rendering component 152 then renders the commands for this context. This is indicated by block 248. Client device 142 then determines whether it has received a user input that changes the context. This is indicated by block 250. If so, then rendering component 152 determines whether the context change can be processed locally. This is indicated by block 252.

For example, and as discussed above with respect to FIG. 2, system 118 may send sets of valid commands for the current context, and for closely related contexts. If that is done, then client device 142 may be able to process the context change and identify the set of valid commands for the new context. This is indicated by block 254. If not, however, then processing reverts to block 242.

It can thus be seen that, because the set of commands is computed for each new context, the command infrastructure (or command identifier system 118) provides an extensible infrastructure in which developers can define their own commands and corresponding actions. Based upon the context in which the commands are invoked, different sets of commands are retrieved and returned.

It will also be noted that, in one embodiment, system 118 simply specifies what the commands are, and they can be rendered differently on each different type of client device 142. For instance, they can be rendered as a command bar, they can be rendered on a command ribbon, or they can be rendered as an edgie when the user swipes in commands on a mobile device, such as a smartphone.

It should also be noted that system 118 can be shared among a plurality of different client devices. Thus, system 118 can be computing different sets of valid commands for a plurality of different client devices, and they can be rendered differently on the client devices, based upon the particular device rendering them.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 4:
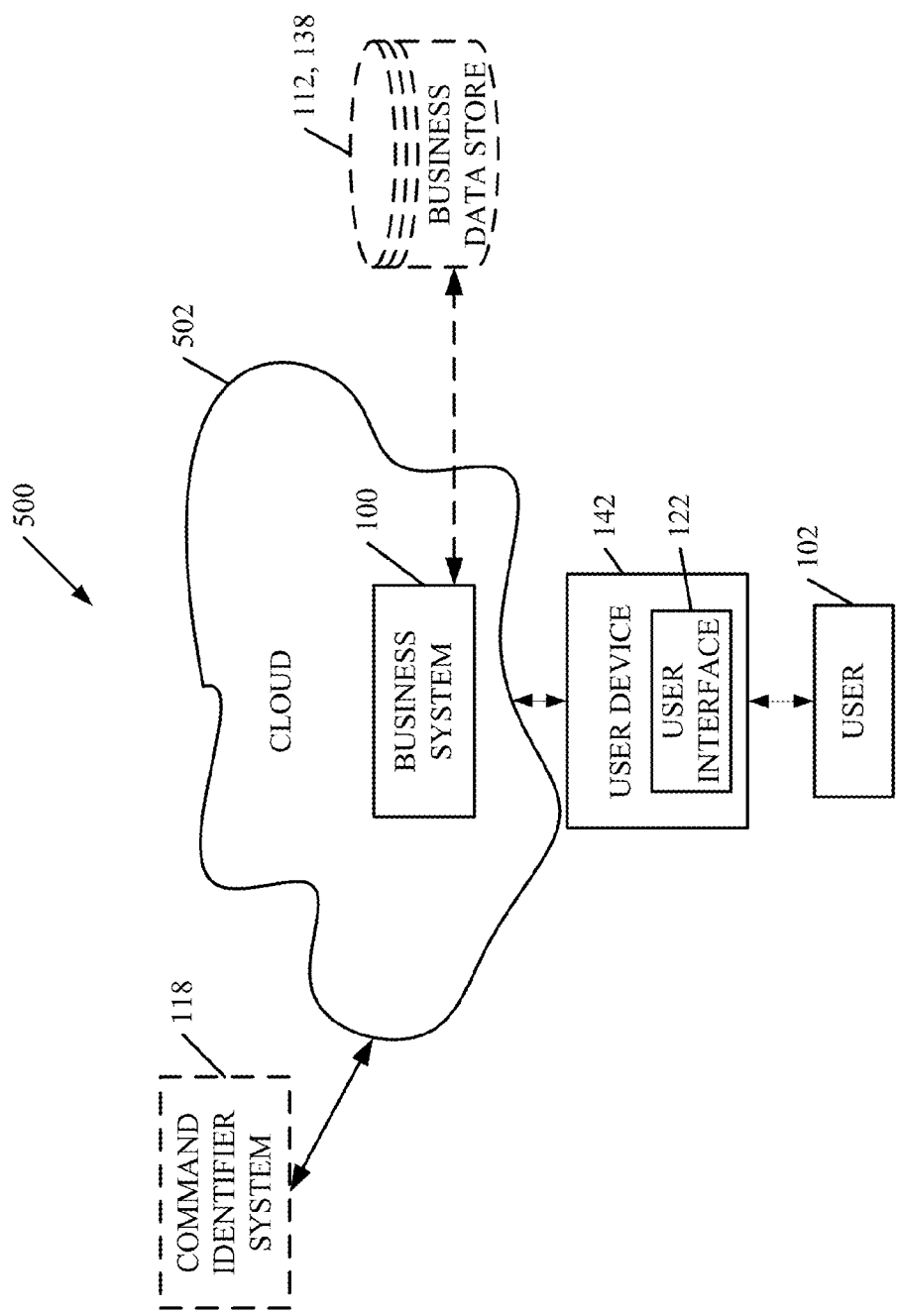
FIG. 4 is a block diagram showing the architecture of FIG. 1 deployed in a cloud computing architecture.

FIG. 4 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the embodiment shown in FIG. 4, some items are similar to those shown in FIG. 1 and they are similarly numbered. FIG. 4 specifically shows that business system 100 can be located in cloud 502 (which can be public, private, or a combination where portions are public while others are private). Therefore, user 108 uses a user device 142 to access those systems through cloud 502.

FIG. 4 also depicts another embodiment of a cloud architecture. FIG. 4 shows that it is also contemplated that some elements of system 100 can be are disposed in cloud 502 while others are not. By way of example, data stores 112 and 138 can be disposed outside of cloud 502, and accessed through cloud 502. In another embodiment, command identifier system 118 is also outside of cloud 502. Regardless of where they are located, they can be accessed directly by device 142, through a network (either a wide area network or a local area network), they can be hosted at a remote site by a service, or they can be provided as a service through a cloud or accessed by a connection service that resides in the cloud. All of these architectures are contemplated herein.

It will also be noted that system 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 5:
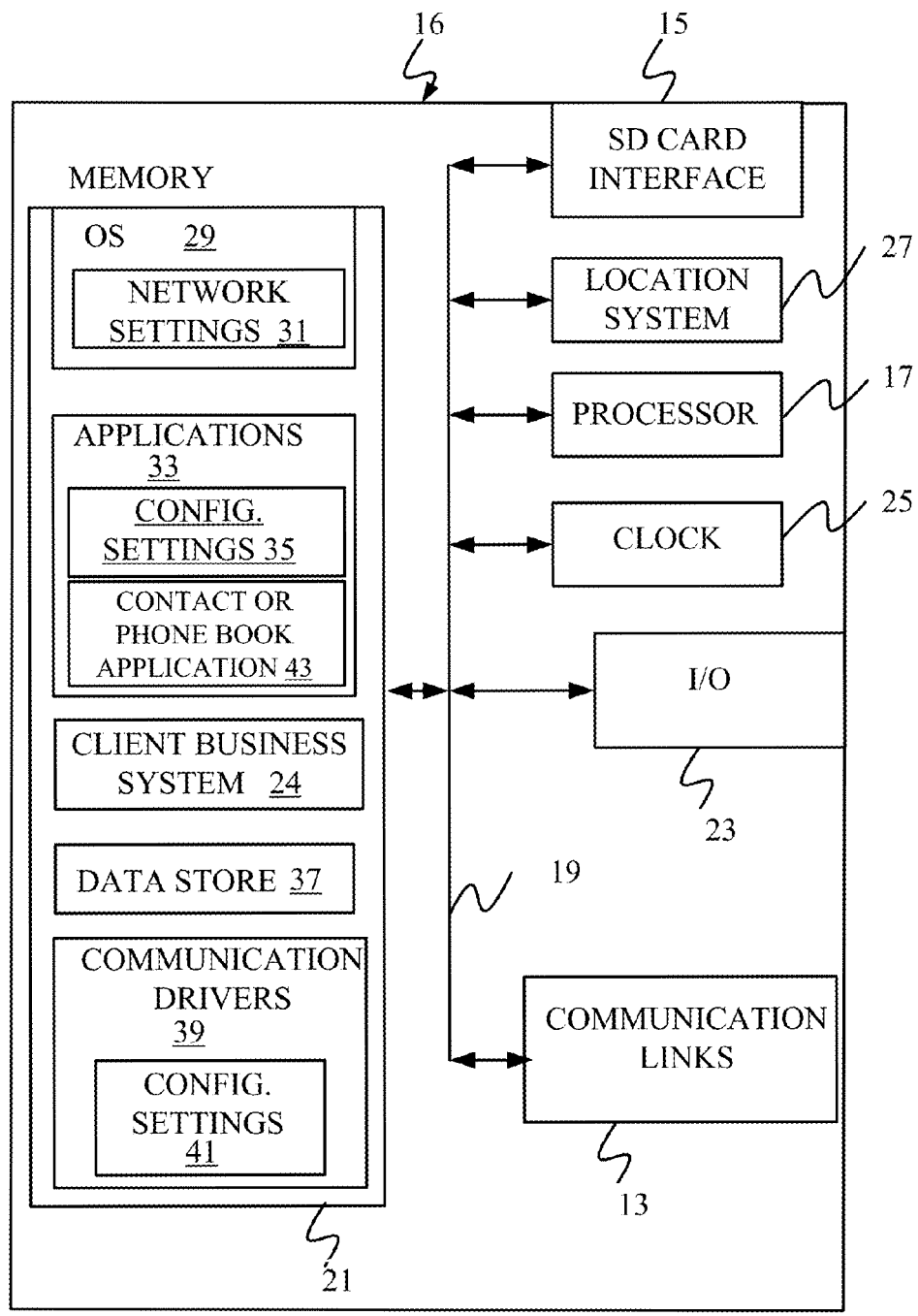
FIGS. 5-9 show various embodiments of mobile devices.

FIG. 5 is a simplified block diagram of one illustrative embodiment of a handheld or mobile computing device that can be used as a user's or client's hand held device 16, in which the present system (or parts of it) can be deployed. FIGS. 6-9 are examples of handheld or mobile devices.

FIG. 5 provides a general block diagram of the components of a client device 16 that can run components of system 100 or that interacts with system 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1×rtt, and Short Message Service, which are wireless services used to provide cellular access to a network, as well as 802.11 and 802.11b (Wi-Fi) protocols, and Bluetooth protocol, which provide local wireless connections to networks.

Under other embodiments, applications or systems are received on a removable Secure Digital (SD) card that is connected to a SD card interface 15. SD card interface 15 and communication links 13 communicate with a processor 17 (which can also embody processors 110 or 146 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

Figure 6:
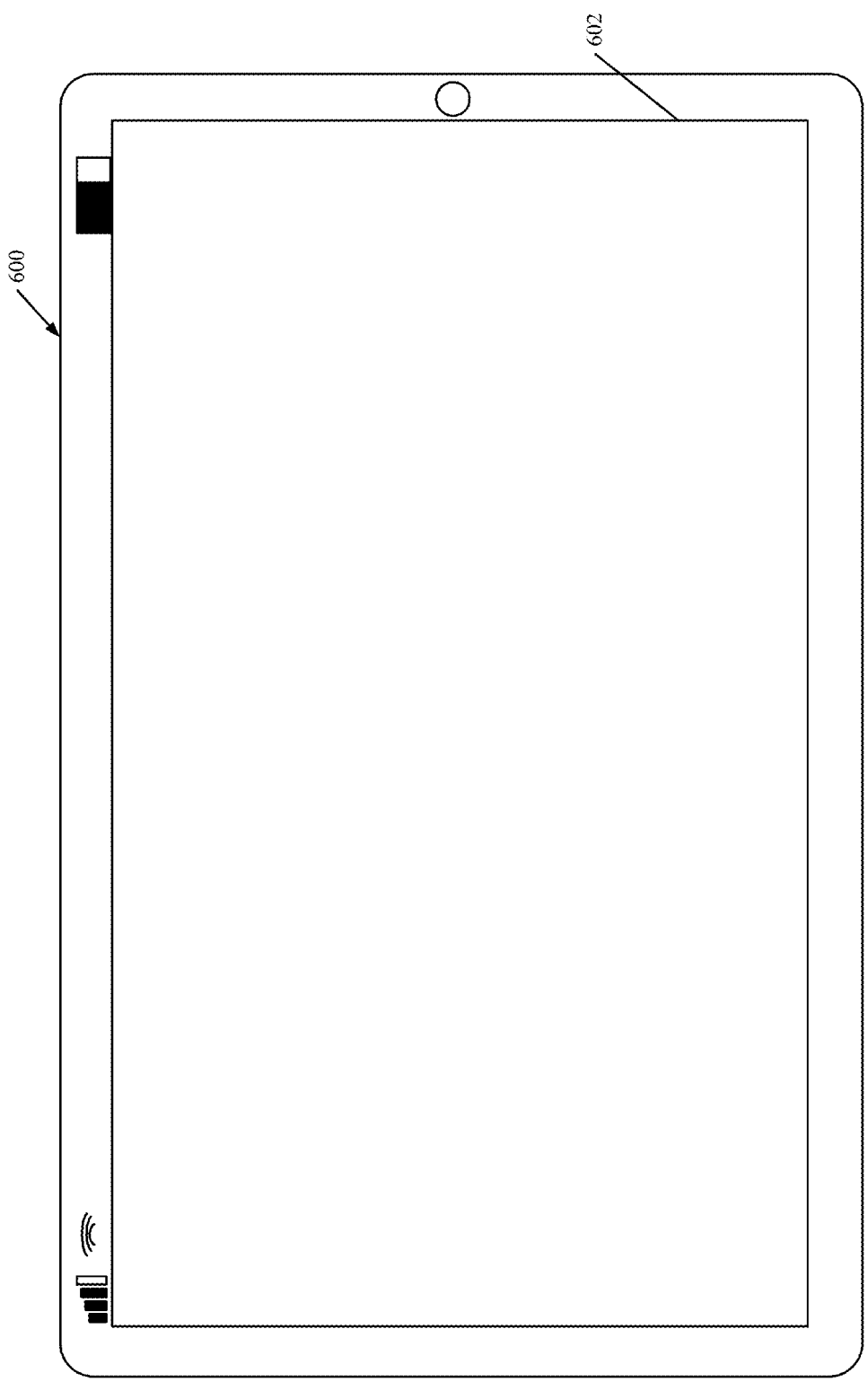

FIG. 6 shows one embodiment in which device 16 is a tablet computer 600. In FIG. 6, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Figure 7:
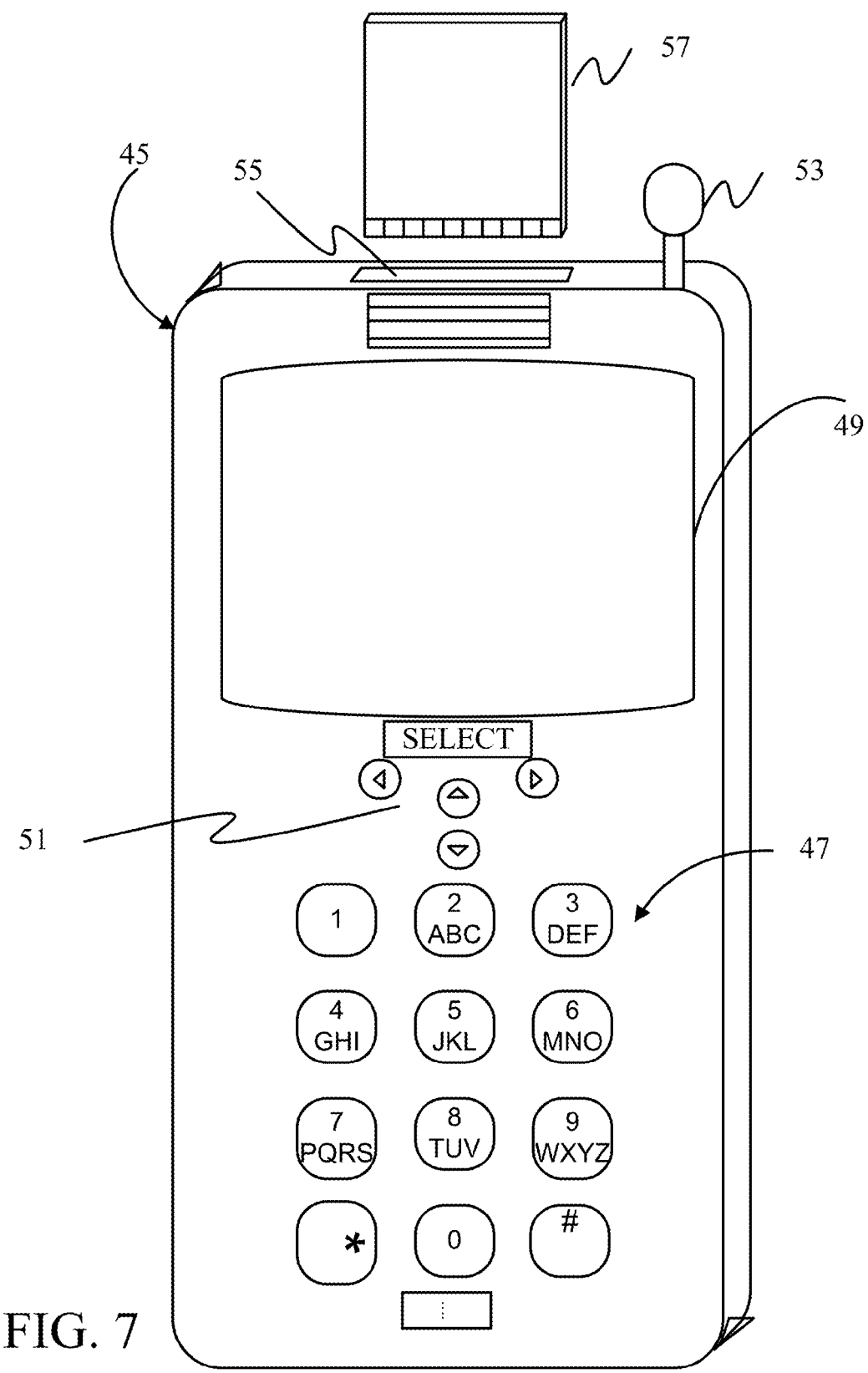
Figure 8:
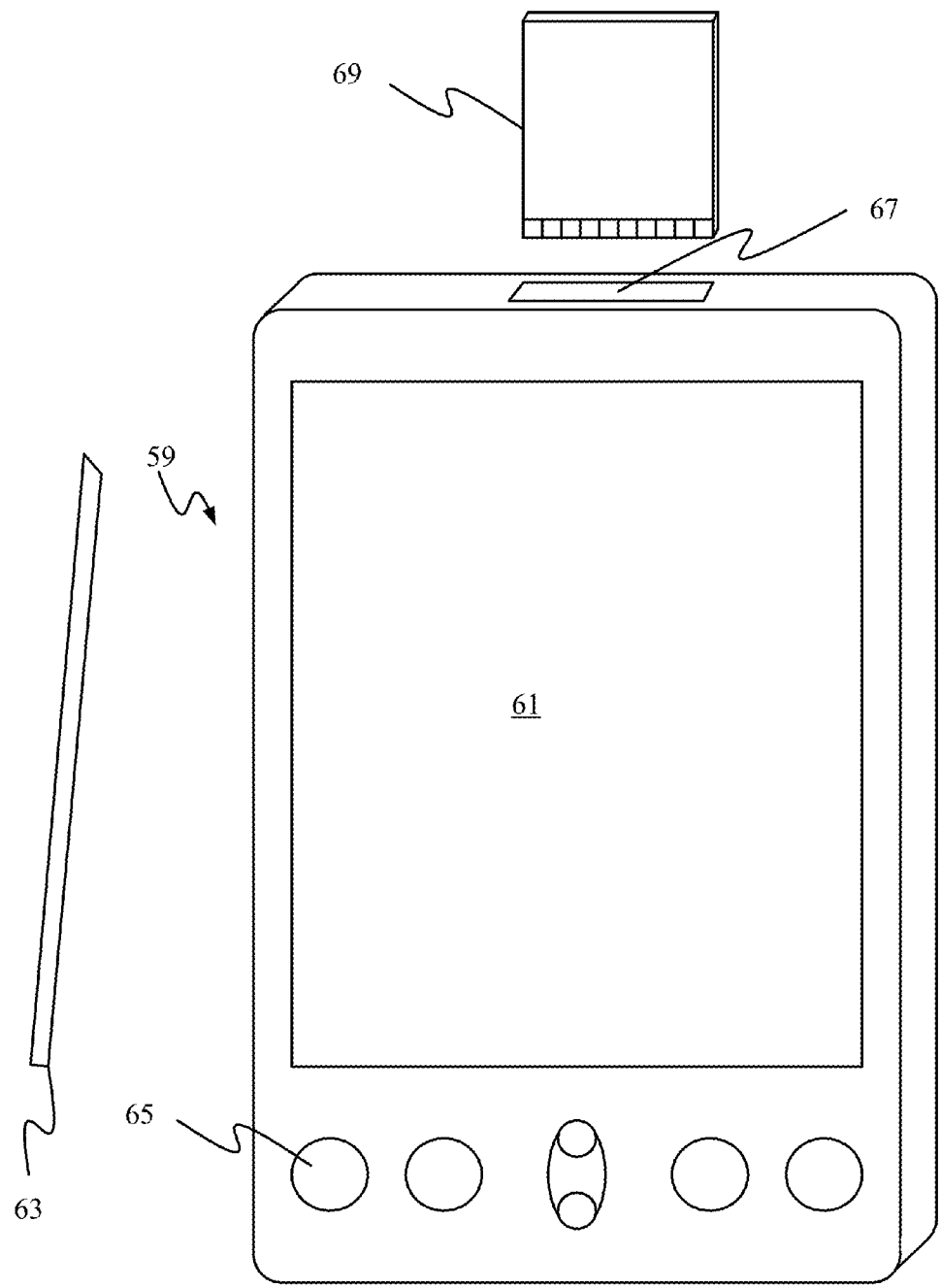

FIGS. 7 and 8 provide additional examples of devices 16 that can be used, although others can be used as well. In FIG. 7, a feature phone, smart phone or mobile phone 45 is provided as the device 16. Phone 45 includes a set of keypads 47 for dialing phone numbers, a display 49 capable of displaying images including application images, icons, web pages, photographs, and video, and control buttons 51 for selecting items shown on the display. The phone includes an antenna 53 for receiving cellular phone signals such as General Packet Radio Service (GPRS) and 1×rtt, and Short Message Service (SMS) signals. In some embodiments, phone 45 also includes a Secure Digital (SD) card slot 55 that accepts a SD card 57.

The mobile device of FIG. 8 is a personal digital assistant (PDA) 59 or a multimedia player or a tablet computing device, etc. (hereinafter referred to as PDA 59). PDA 59 includes an inductive screen 61 that senses the position of a stylus 63 (or other pointers, such as a user's finger) when the stylus is positioned over the screen. This allows the user to select, highlight, and move items on the screen as well as draw and write. PDA 59 also includes a number of user input keys or buttons (such as button 65) which allow the user to scroll through menu options or other display options which are displayed on display 61, and allow the user to change applications or select user input functions, without contacting display 61. Although not shown, PDA 59 can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections. In one embodiment, mobile device 59 also includes a SD card slot 67 that accepts a SD card 69.

Figure 9:
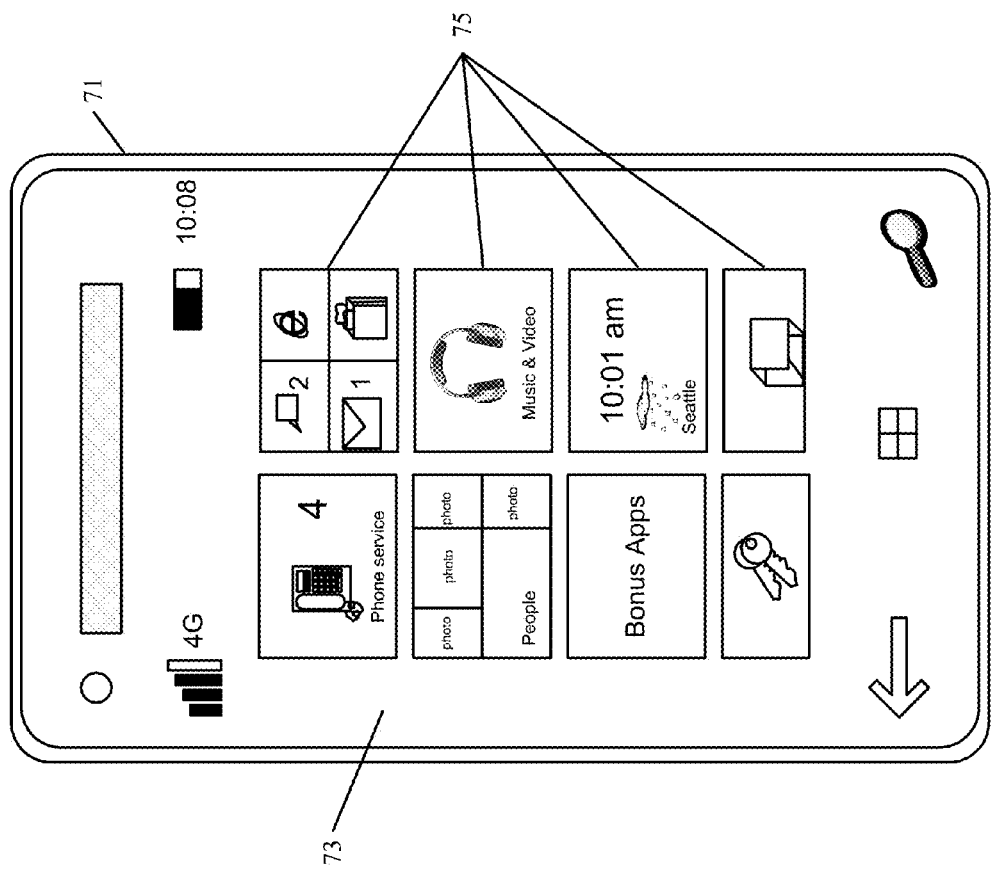

FIG. 9 is similar to FIG. 7 except that the phone is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 10:
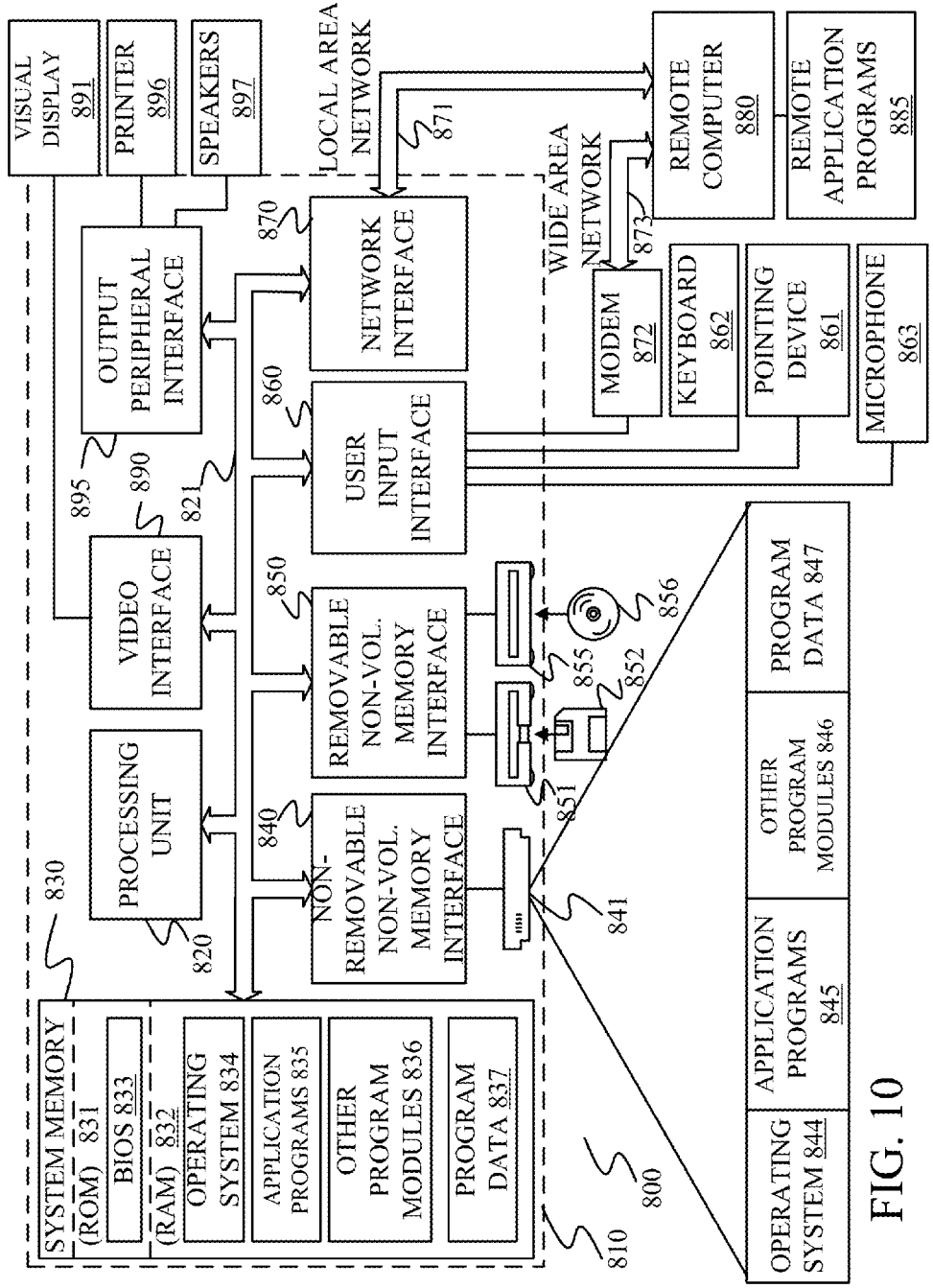
FIG. 10 is a block diagram of one illustrative computing environment.

FIG. 10 is one embodiment of a computing environment in which architecture 100, or parts of it, (for example) can be deployed. With reference to FIG. 10, an exemplary system for implementing some embodiments includes a general-purpose computing device in the form of a computer 810. Components of computer 810 may include, but are not limited to, a processing unit 820 (which can comprise processor 110 or 146), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 10.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 10 illustrates operating system 834, application programs 835, other program modules 836, and program data 837.

The computer 810 may also include other removable/non-removable volatile/nonvolatile computer storage media. By way of example only, FIG. 10 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 10, provide storage of computer readable instructions, data structures, program modules and other data for the computer 810. In FIG. 10, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 10 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 10 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computer-implemented method, comprising:
identifying a computer system context based on context information received from a client device;
identifying a set of valid commands based on the computer system context; and
sending the set of valid commands to the client device.

Example 2 is the computer-implemented method of example 1 and further comprising:
receiving the context information, indicative of the computer system context, from the client device.

Example 3 is the computer-implemented method of one or more previously examples wherein the computer system comprises a business system, the computer system context comprises a context within the business system, and wherein identifying a set of valid commands comprises:
identifying a set of valid business system commands based on the context within the business system.

Example 4 is the computer-implemented method of one or more previously examples and further comprising:
identifying a plurality of different contexts based on the identified context within the business system; and
identifying a plurality of different sets of valid commands, one set for each of the plurality of different contexts.

Example 5 is the computer-implemented method of one or more previously examples and further comprising:
sending the plurality of different sets of valid commands to the client device.

Example 6 is the computer-implemented method of one or more previously examples wherein identifying the set of valid commands comprises:
searching a data store of command sets based on the context information.

Example 7 is the computer-implemented method of one or more previously examples wherein the context information is indicative of a context of a displayed page of the business system on the client device and wherein identifying a plurality of different sets of valid commands comprises:
identifying one set of commands for each of a plurality of different contexts on the displayed page;
merging the sets of commands for each of the plurality of different contexts on the displayed page; and
sending the merged set of commands to the client device.

Example 8 is the computer-implemented method of one or more previously examples wherein identifying a computer system context comprises:
identifying one or more of a global computer system context, a data context, a page type context, a business process context, and a component type context.

Example 9 is a computer system, comprising:
an application component that runs an application;
a command identifier system that identifies a set of commands to be rendered based on a context of the application; and
a computer processor that is a functional part of the system and is activated by the application component and the command identifier to facilitate running the application and identifying the set of commands.

Example 10 is the computer system of one or more previously examples wherein the command identifier system comprises:
a context identifier component that receives context information indicative of the context of a rendered page of the application and that identifies the context of the rendered page of the application based on the context information.

Example 11 is the computer system of one or more previously examples wherein the application comprises a business application.

Example 12 is the computer system of one or more previously examples wherein the context identifier component identifies the context and a set of related contexts based on the context information.

Example 13 is the computer system of one or more previously examples wherein the command identifier identifies a different set of commands corresponding to the context and each of the set of related contexts.

Example 14 is the computer system of one or more previously examples wherein the command identifier identifies a different set of commands corresponding to a context for each of a plurality of display elements on the rendered page.

Example 15 is the computer system of one or more previously examples wherein the command identifier system comprises:
a merge component that merges the different sets of commands.

Example 16 is the computer system of one or more previously examples and further comprising:
a command set data store that stores the different sets of commands for accessing by the command identifier system.

Example 17 is a computer-implemented method, comprising:

sending context information indicative of a context of an application to a command identifier system;

receiving a set of commands corresponding to the context of the application from the command identifier system; and rendering the set of commands in the application.

Example 18 is the computer-implemented method of one or more previously examples and further comprising:

identifying a context for each of a plurality of different components on a displayed page of an application to obtain the context information.

Example 19 is the computer-implemented method of one or more previously examples wherein receiving a set of commands comprises:

receiving a plurality of different sets of commands for a plurality of different contexts, based on the context information;

receiving a user input changing the context of the application to a modified context;

determining whether the modified context is one of the plurality of different contexts; and if so, rendering commands corresponding to the modified context.

Example 20 is the computer-implemented method of one or more previously examples and further comprising:

if the modified context is not one of the plurality of different contexts, then sending context information indicative of the modified context to the command identifier system to obtain a set of commands that are valid for the modified context.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computer-implemented method, comprising:
   receiving, by a server that is remote from a client device, context information indicative of context of a plurality of display components on a displayed page of an application on the client device;
   automatically identifying, by the server, a context for each of the display elements based on the context information received from the client device;
   searching a data store of commands and identifying, by the server, a valid command set for each of the contexts;
   merging the sets of commands; and
   sending, by the server, the merged commands to the client device.

2. The computer-implemented method of claim 1 wherein the application comprises a business application, the context comprises a context within the business application, and wherein identifying a set of valid commands comprises: identifying a set of valid business application commands based on the context within the business application.

3. The computer-implemented method of claim 1, wherein the context information is indicative of a user input mechanism on a user interface display of the client device, and wherein identifying a context of the application comprises:
   identifying one or more of: a global computer system context, a data context, a page type context, a computing process context, or a component type context.

4. A computer system, comprising:
   a communication interface configured to communicate with a client device, that is remote from the computer system, over a network;
   a processor; and
   memory storing instructions executable by the processor, wherein the instructions configure the computer system to:
   execute an application to generate an application page;
   send a representation of the application page to the client device;
   receive context information relative to a component of the application page from the client device;
   based on the context information, automatically identify a context of the application page and a set of related contexts on the client device;
   search a data store of command sets and identify a command related to the component and different sets of commands corresponding to a context for each of a plurality of display elements, the command to be rendered based on the identified context of the application page;
   merge the different sets of commands; and
   send the command to the client device.

5. The computer system of claim 4 wherein the command sets identify a plurality of commands, and the instructions configure the computer system to:
   identify a subset of the plurality of commands; and
   send the subset of commands to the client device.

6. The computer system of claim 5 wherein the application comprises a business application.

7. A computer-implemented method, comprising:
   sending, by a client device, context information indicative of context of a plurality of components on an application page to a command identifier computing system that is remote from the client device;
   receiving, by the client device from the command identifier computing system, a set of commands for each of a plurality of different contexts based on the context information, the commands corresponding to the context of each component on the page of the application; and
   generating a user input mechanism corresponding to at least one command in the set of commands;
   receiving a user input changing the context of the application to a modified context;
   determining whether the modified context is one of the plurality of different contexts;
   if so, rendering commands corresponding to the modified context; and
   rendering, by the client device, the user input mechanism on a user interface display to provide the application page with the plurality of components.

8. The computer-implemented method of claim 7 and further comprising:
   if the modified context is not one of the plurality of different contexts, then sending context information indicative of the modified context to the command identifier system to obtain a set of commands that are valid for the modified context.

* * * * *

UNITED STATES PATENT AND TRADEMARK OFFICE
CERTIFICATE OF CORRECTION

PATENT NO. : 9,804,749 B2
APPLICATION NO. : 14/303082
DATED : October 31, 2017
INVENTOR(S) : Anusha Shabkar, Bharath Swaminathan and Ramanathan Pallassana Page 1 of 1

It is certified that error appears in the above-identified patent and that said Letters Patent is hereby corrected as shown below:

In the Claims

Column 13 Claim 1 Line 43 change the word "elements" to "components"

Signed and Sealed this
Sixth Day of March, 2018

Andrei Iancu
*Director of the United States Patent and Trademark Office*